United States Patent [19]
Bruning et al.

[11] 4,414,014
[45] Nov. 8, 1983

[54] METHOD OF PRODUCING A BUBBLE-FREE VITREOUS MATERIAL

[75] Inventors: Rolf Bruning; Poul-Erik Breidenbach, both of Bruchköbel; Norbert Cibis, Frankfurt am Main; Fritz Aldinger, Rodenbach; Waltraud Werdecker, Hanau, all of Fed. Rep. of Germany

[73] Assignee: Heraeus Quarzschmelze GmbH, Hanau am Main, Fed. Rep. of Germany

[21] Appl. No.: 312,469

[22] Filed: Oct. 19, 1981

[30] Foreign Application Priority Data

Oct. 22, 1980 [DE] Fed. Rep. of Germany ....... 3039749

[51] Int. Cl.³ .............. C03B 20/00; C03B 32/00; C03C 15/02
[52] U.S. Cl. ........................................ 65/31; 65/32; 65/61; 65/111
[58] Field of Search ............... 65/31, 32, 61, 111, 65/157; 264/65, 67

[56] References Cited

U.S. PATENT DOCUMENTS

| 3,220,814 | 11/1965 | Haven et al. | 65/32 |
| 3,228,760 | 1/1966 | Jack et al. | 65/32 |
| 3,459,565 | 8/1969 | Jones et al. | 65/32 X |
| 3,813,276 | 5/1974 | Trap | 65/31 X |
| 3,864,111 | 2/1975 | Kemp | 65/31 |
| 4,370,158 | 1/1983 | Schülke | 65/32 |

Primary Examiner—Richard V. Fisher
Attorney, Agent, or Firm—Sprung, Horn, Kramer & Woods

[57] ABSTRACT

For the production of a bubble-free vitreous material, and in particular bubble-free vitreous silica, bubbles-containing vitreous material is exposed in a furnace, at a temperature which reduces its viscosity to a value between $10^{13.5}$ and $10^8$ Pa.sec, to the omnidirectional pressure ranging from 100 to 3000 bars of a gas which is insoluble in the vitreous material for a period of not less than 10 minutes and is then cooled.

12 Claims, 1 Drawing Figure

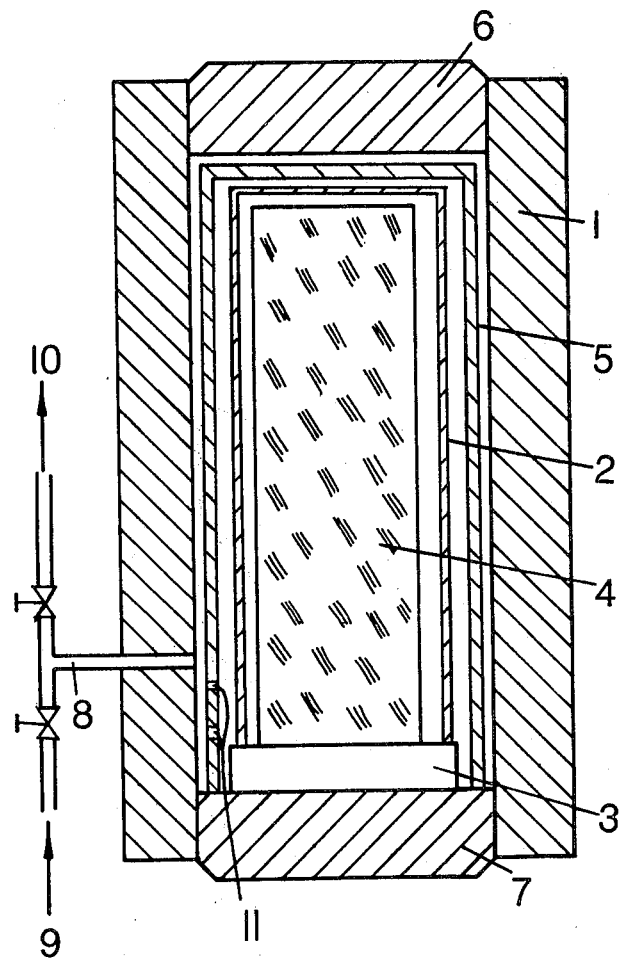

METHOD OF PRODUCING A BUBBLE-FREE VITREOUS MATERIAL

BACKGROUND OF THE INVENTION

1. Field of the Invention

The invention relates to a method of producing a bubble-free vitreous material, and in particular bubble-free vitreous silica, from a bubbles-containing vitreous material, and in particular vitreous silica, by subjecting the latter in the heated state to elevated gas pressure.

In the optical and lampmaking fields, glasses have long been needed which are as free of bubbles as possible. Various proposals have therefore been published in the past for solving the problem of producing bubble-free vitreous materials.

2. Discussion of the Prior Art

According to German Pat. No. 310,134 dated Jan. 2, 1922, for example, bubble-free fused quartz is produced by melting quartz under vacuum and holding the molten quartz under superatmospheric pressure until it solidifies. The superatmospheric pressure employed is such that the gas bubbles are reduced to the volume which they would have at normal temperature. It is recommended that the pressure employed not be too high as otherwise the cooled quartz would have high internal stresses that would render it unfit for optical use.

A similar method is proposed in German Pat. No. 854,073 dated Oct. 30, 1952. Small-sized rock crystal or granular precipitated silica is charged to a furnace for melting, and a hydrogen atmosphere is maintained in the furnace under a pressure ranging from 10 to 150 mm Hg until the melting temperature is reached, and also for the duration of the melting operation, which takes 10 minutes, the pressure being raised to about 1 to 2 atmospheres at the end of the melting process. Now the vitreous silica so produced contains dissolved hydrogen and cannot be used directly in the production of mercury-vapor lamps, for example, since in the operation of such lamps hydrogen would be liberated by the vitreous silica that would result in an increase in the firing potential.

With said prior-art methods, the elimination of macrobubbles, in other words, bubbles which are visible to the naked eye, is assured.

SUMMARY OF THE INVENTION

In contrast thereto, the object of the invention is to provide shaped articles made of a bubble-free vitreous material, and in particular bubble-free vitreous silica, which are free not only of macrobubbles but also of microbubbles, that is to say, bubbles which are not visible to the naked eye and which have an average diameter of less than 0.1 mm.

In accordance with the invention, this object is accomplished by subjecting the bubbles-containing vitreous material, disposed on a support in a furnace, to the omnidirectional pressure ranging from 100 to 3000 bars of a gas which is insoluble in the material, at a temperature which reduces the viscosity of the material to a value between $10^{13.5}$ and $10^8$ Pa.sec, for a period of not less than 10 minutes and then cooling it to room temperature over a period of less than 10 hours.

Advantageously the vitreous material is treated at a temperature which will reduce its viscosity to a value ranging from $10^{11}$ to $10^9$ Pa.sec. The preferred gas pressure ranges from 200 to 1000 bars, and the preferred gas is argon. The time in which the vitreous material treated is cooled to a temperature of 373° K. is preferably less than 3 hours. It has been found that the method in accordance with the invention is particularly well suited for the production of a material that is free of both micro- and macrobubbles from vitreous materials which have been flame-melted, and in particular vitreous silica melted by means of a hydrogen-oxygen flame.

The method in accordance with the invention involves, not a temporary size reduction of the bubbles which may be reversed through the heating at normal pressure which follows, but the permanent elimination even of microbubbles. Surprisingly, it has been found that the method of the invention yields vitreous shaped articles which even in subsequent processing, such as by glass-blowing techniques, for example, exhibit no renewed bubble formation. The explanation is probably that the method in accordance with the invention permits the complete closing of the bubbles.

The pressure acting omnidirectionally on the bubbles-containing vitreous material is, as indicated, exerted by a gas which is insoluble in the vitreous material. For the purposes of the invention, an insoluble gas is also one which will not diffuse rapidly into into the vitreous material under the conditions of temperature, pressure and time specified. Molecules of the treating gas are thus prevented from infiltrating the heated material and bringing about a pressure equalization in bubbles which have not closed as yet that would preclude any further reduction of the volume of the bubbles.

The duration of the treatment under elevated pressure required for the elimination of bubbles from the vitreous material will depend on the type of gases contained in the bubbles. Readily diffusing or readily soluble gases such as helium, hydrogen or water vapor will require a relatively short treating time.

The method in accordance with the invention offers the advantage that it permits bubbles-containing shaped articles made from a vitreous material to be freed of macro- and microbubbles while substantially retaining their outside dimensions. The method is thus applicable to both semimanufactured and finished products made of a vitreous material. Bubbles due to processing which are introduced into the shaped article after the melting operation can be reliably removed by the method of the invention.

BRIEF DESCRIPTION OF DRAWINGS

An apparatus for carrying out the method in accordance with the invention is shown diagrammatically in the accompanying drawing which is a cross sectional view of a furnace useful in practicing the invention.

DESCRIPTION OF SPECIFIC EMBODIMENT

A hollow cylinder 1 of a commercial high-pressure autoclave contains in its interior an electric furnace 2 having the form of a hollow cylinder. Inside the furnace there is a support 3 on which the bubbles-containing shaped articles 4 to be treated are disposed. The furnace is surrounded by an insulating hood 5 with vents 11 which prevents the autoclave cylinder and its cover from heating up. The autoclave is charged either through the cover 6, disposed on the front, or the bottom 7. For the introduction of the treating gas there is provided a feed pipe 8 which is connected to an inlet pipe 9 and an outlet pipe 10.

For their treatment, the shaped vitreous silica articles 4 are placed on the support 3. The treatment is carried out at a temperature between 1550° and 1770° K., which corresponds to a viscosity between $10^{11}$ and $10^9$ Pa.sec. Assurance is thus provided that the outside dimensions of the shaped articles will not change during the treatment. A pressure between 300 and 1000 bars is selected. The residence time of the shaped articles during the pressure treatment ranges from 30 to 90 minutes. Preferably, the vitreous material is cooled in less than 1 hour to below 1200° K. It has been found advantageous to introduce gas into the cold autoclave only up to a pressure level below the desired final pressure and to utilize the thermal expansion of the gas to produce the final pressure. Argon has proved to be a particularly suitable gas since it diffuses only very slowly into vitreous silica. However, there is no way of preventing the argon from penetrating the surface of the shaped vitreous silica articles to a depth of less than 1 mm during the treatment. The argon is best eliminated from the treated vitreous silica by mechanically or chemically removing a thin surface layer from the article. Thus this thin surface of treated cooled vitreous material can be removed to a depth of not more than 2 mm prior to further hot working. This is best done by etching with aqueous hydrofluoric acid. As a result of this treatment, the vitreous materials treated in accordance with the invention will not during subsequent sudden heating exhibit a foamlike surface that would probably be due to the fact that the sudden and rapid heating prevented the treating gas, argon in particular, from diffusing out of the shaped article quickly enough. The thickness of the surface layer penetrated by the gas naturally depends on the residence time under high pressure and also on the effect of the temperature, which is why the treated shaped articles should be cooled as rapidly as possible.

It will be appreciated that the instant specification and claims are set forth by way of illustration and not of limitation, and that various changes and modifications may be made without departing from the spirit and scope of the present invention.

What is claimed is:

1. A method for the production of a shaped article of a bubble free vitreous material, and in particular bubble free vitreous silica, formed a shaped article of bubbles-containing vitreous material, and in particular vitreous silica, which comprises heating said material in the form of a shaped article while said shaped article is disposed on a support in a furnace and while heating said shaped article applying an omnidirectional gas pressure thereagainst which pressure is applied by a gas which is insoluble in said material, said gas being at an omnidirectional pressure of 100 to 3,000 bars, said material being heated to a temperature which reduces the viscosity of said material to a value between $10^{13.5}$ and $10^8$ Pa.sec, said material in the form of a shaped article being heated at said temperature and pressure for a period of not less than 10 minutes and thereafter cooling said material to room temperature over a period of less than 10 hours.

2. A method according to claim 1, wherein the vitreous material is treated at a temperature which reduces its viscosity to a value between $10^{11}$ and $10^9$ Pa.sec.

3. A method according to claim 1, wherein a gas pressure ranging from 200 to 1000 bars is employed.

4. A method according to claim 1, wherein the gas used is argon.

5. A method according to claim 1, wherein the vitreous material treated is cooled to a temperature of 373° K. over a period of less than 3 hours.

6. A method according to claim 1, wherein a flame-melted vitreous material is used.

7. A method according to claim 6, wherein vitreous silica melted by means of a hydrogen-oxygen flame is used.

8. A method according to claim 1, wherein vitreous silica is subjected at a temperature ranging from 1550° to 1770° K. to an omnidirectionally gas atmosphere of a pressure ranging from 300 to 1000 bars for a period of from 30 to 90 minutes and then is cooled in less than 1 hour to a temperature below 1200° K.

9. A method according to claim 1, wherein a thin surface of the treated, cooled vitreous material is removed to a depth of not more than 2 mm prior to further hot working.

10. A method according to claim 9, wherein the outer layer of a treated vitreous silica article is removed by etching with aqueous hydrofluoric acid.

11. A method according to claim 8, wherein said gas is argon.

12. A method according to claim 1, wherein said shaped article is a shaped article of vitreous silica.

* * * * *